United States Patent [19]

Murer et al.

[11] 4,124,747

[45] Nov. 7, 1978

[54] CONDUCTIVE POLYOLEFIN SHEET ELEMENT

[75] Inventors: Angelo Murer; Ottavio Amadei, both of Brussels, Belgium

[73] Assignee: Exxon Research & Engineering Co., Linden, N.J.

[21] Appl. No.: 801,543

[22] Filed: May 31, 1977

Related U.S. Application Data

[63] Continuation-in-part of Ser. No. 767,113, Feb. 9, 1977, abandoned, which is a continuation of Ser. No. 583,614, Jun. 4, 1975, abandoned.

[30] Foreign Application Priority Data

Jun. 4, 1974 [GB] United Kingdom .............. 24665/74

[51] Int. Cl.$^2$ .......................... C08K 3/04; H01B 1/04
[52] U.S. Cl. ................................. 429/210; 252/511; 260/42.46; 428/220
[58] Field of Search ................... 260/42.46; 252/511; 428/220; 429/210

[56] References Cited

U.S. PATENT DOCUMENTS

| 3,104,945 | 9/1963 | Williams | 252/511 |
| 3,591,526 | 7/1971 | Kawashima et al. | 252/511 |
| 3,673,121 | 6/1972 | Meyer | 252/511 |

*Primary Examiner*—James H. Derrington
*Attorney, Agent, or Firm*—Joseph J. Dvorak

[57] ABSTRACT

An electrically conductive non-porous polyolefin composition comprising a homogeneous mixture of propyleneethylene copolymer containing 20 mol % to 35 mol % ethylene and at least 30 parts by weight of finely divided conductive carbon, e.g. carbon black, per 100 parts by weight of copolymer. This composition may be made by mixing under conditions of high shear, e.g. in a Banbury mixer, and at a temperature of at least 100° C the propylene-ethylene copolymer and the finely divided conductive carbon, the mixing being continued until a homogeneous blend is obtained. A bi-polar sheet for an electrochemical cell may be formed by obtaining a homogeneous blend of polyolefin and finely divided conductive carbon by the above-mentioned process and thereafter forming the composition into the shape of a bi-polar plate.

9 Claims, No Drawings

CONDUCTIVE POLYOLEFIN SHEET ELEMENT

CROSS-REFERENCE TO RELATED APPLICATIONS

This application is a continuation-in-part of application Ser. No. 767,113, filed Feb. 9, 1977, now abandoned, which in turn is a continuation of application Ser. No. 583,614, filed June 4, 1975, now abandoned.

BACKGROUND OF THE INVENTION

1. Field of the Invention

The present invention relates to the preparation, and in particular the extrusion, of electrically conducting nonporous thin sheet elements from polyolefins, useful especially in the construction of bipolar plates for electrochemical cells.

2. Prior Art

Many attempts have been made to make conductive or semi-conductive materials from polymeric plastics loaded with conductive solids such as carbon black, graphite, or finely divided metals. All manner of thermosetting and thermoplastic resins have been proposed including melamine, phenol-aldehyde, and more commonly polyolefins such as polyethylene and graft copolymers thereof and polytetrafluoroethylene. See, for example, U.S. Pat. Nos. 3,591,526 and 3,673,121.

In general, compositions of relatively low resistance can be prepared by dry mixing a finely divided thermoplastic polymer and conductive filler and molding the mixture under heat and pressure. Such molded products are normally porous and nonhomogeneous in structure, and accordingly are not suitable for certain sophisticated applications which require thin impermeable conductors of highly uniform composition. An example of such a sophisticated application is a bipolar plate for a fuel cell or battery. In this regard, see, for example, U.S. Pat. Nos. 3,814,631 and 3,530,003.

A far higher degree of homogeneity than is obtained by a dry blending process can be obtained by the use of known mixing devices such as a Banbury mixer or roll mill. French Pat. No. 1,305,140 describes the preparation in a Banbury mixer of a number of blends of carbon black or graphite in a crystalline polypropylene with or without an amorphous copolymer plasticizer. The resistivities of these blends were all of the order of a number of megohms-cm and they are described as suitable for use as thermistors and semi-conductors. In addition, the mixing time in the Banbury mixer is of the order of 30 minutes and this inevitably results in some thermal degradation of the polypropylene with consequent impairment of its physical and mechanical properties. Moreover, such carbon-plastic blends are not capable of being easily formed, for example, by extrusion, into thin nonporous sheet-like structures, particularly thin sheet elements, having thicknesses, for example, of from about 150μ to about 500μ.

When carbon black is incorporated in a polymer such as rubber or polypropylene in a Banbury or similar mixer, there is an upper limit to the amount that can be incorporated to give a homogeneous product. When this limit is exceeded, heterogeneous particles or carbon exist in the mixture and can be identified as such in a number of different ways. The greater the amount of carbon which a given polymer can take up, the better is what can be called its binder efficiency. Three test methods used to measure binder efficiency are briefly described below. In all cases the loaded polymer was ground into granules of about 2 mm diameter.

(a) Plate-out Test

A white polypropylene compound is melted for 5 minutes on a mill roll at 160° C. When a good rolling pencil is obtained, three grams of the carbon loaded granules are added and the sheet immediately stripped. If the carbon black is properly incorporated, the individual granules are taken up by the white polypropylene without the latter being stained. If not, the white sheet becomes locally stained gray by the free carbon.

(b) Extraction Test

The carbon-loaded granules mentioned above are extracted with isopropanol in a Soxhlet apparatus. Any free carbon black dust shows itself as a black turbidity.

(c) Cracks Test

The examined compound is extruded through a flat die 12 cm wide to a 0.25 thick sheet and corrugated between rolls. It is then visually examined for cracks or fissures. If present, these indicate the presence of free carbon, and simultaneously show that the sheet cannot have uniform resistance over its surface.

When carbon black is used as a reinforcing agent in rubber, and particularly for tires, a typical concentration is 45 phr, or 45 parts by weight of black per 100 parts by weight of rubber. So-called "master batches" intended for subsequent dilution with additional rubber may be made up containing 70 to 75 phr of black. The resistance of such a master batch would be of the order of a few hundred ohms-cm.

As already indicated, low resistance compounds may be made by the treatment under heat and pressure of dry-mixed blends of finely divided carbon black and polymer. These are heterogeneous, have relatively poor mechanical properties and are porous. Since the blends are always heterogeneous, the concept of binder efficiency as a measure of the maximum carbon content which can be taken up to give a homogeneous blend is no longer applicable.

It is known to cast electrically conductive polymer films from solutions. In this regard, see, for example, U.S. Pat. No. 3,104,958. Typically such films are cast on a supporting substrate since plastic films cast from solution are exceedingly thin, indeed generally below about 100μ, typically about 10μ to 50μ, and require support to maintain their structural integrity. Also, these films generally are porous. In any event, the concept of binder efficiency as a measure of the maximum carbon content which can be taken up by the polymer to give a homogeneous blend is not applicable to solution casting techniques.

SUMMARY OF THE INVENTION

It has now been discovered, in accordance with the present invention, that by proper selection of the starting materials and preferably by the use of a particular blending technique, it is possible to prepare nonporous, homogeneous conductive carbon polyolefin elements in thin flat sheet or thin foil forms having exceptionally low resistivity, uniform electrical properties, and good mechanical properties. Such elements are particularly useful in the manufacture of bi-polar plates for electrochemical cells such as fuel cells and storage batteries.

DETAILED DESCRIPTION OF THE INVENTION

(a) The Starting Materials

In forming the electrically conductive nonporous polyolefin element, a homogeneous mixture of a crystalline propylene-ethylene thermoplastic copolymer having at least 20 mole % ethylene and at least 30 parts by weight of finely divided conductive carbon per 100 parts by weight of copolymer is employed. Indeed, the copolymer has a minimum ethylene content of 20 mole % and for practical purposes the ethylene content should not exceed about 35 mole % since above this level the thermoplastic characteristics tend to be lost and the product becomes an elastomer. In addition, the copolymer, when intended for electrochemical cell use is preferably highly purified, e.g. by extraction with solvents such as chloroform or isopropanol, to remove catalyst residues and stabilizers which could act as poisons or otherwise interfere with the electrochemical reactions taking place in the cells. Obviously this is not necessary when the end use is one in which their presence is harmless. A desirable class of copolymers is that having a Melt Flow Rate (MFR) of at least 5 and preferably from 5 to 10.

The preferred form of finely divided conductive carbon used in the practice of the present invention is carbon black since it is cheap, readily available and gives extremely good results. The finely divided conductive carbon, e.g. carbon black, generally should be present in from 30 to 120 parts by weight per hundred parts by weight of copolymer and preferably in from 70 to 100 parts by weight per hundred parts by weight of copolymer. Part or all of the carbon black may be replaced by graphite.

Acetylene blacks are preferred because of their good electrical properties, but obviously furnace blacks and channel blacks can also be used. Suitable commercially available blacks are available under the Trade Name of Vulcan (e.g. Vulcan 3, Vulcan XXX and Vulcan XC-72).

Usually the finely divided conductive carbon has an active surface area of 300 to 500 $m^2/gm$.

It was found experimentally that crystalline polypropylene homopolymer, for example has a binder efficiency which is far too low to give a homogeneous mixture with finely divided carbon and, consequently, elements formed from such blends do not have uniform electrical properties over the entire surface of such elements. Indeed, for use as bipolar plates in electrochemical cells, the volume resistance perpendicular to the plate face of the polyolefin element is most significant, and elements prepared from crystalline polypropylene, for example, did not have electrical resistivities approaching desirable values of below about 10 ohm-cm as measured by ASTM D-257-61.

The proper selection of starting materials also is important in the shaping or forming of the materials into nonporous plate-like structures for use as bipolar plates for electrochemical cells. A battery of such bipolar plate is shown, for example, in U.S. Pat. No. 3,530,003 wherein each bipolar plate of the battery is a thin sheet-like electrically conductive plastic element in an insulating plastic holding frame. For use as an electrically conductive sheet element, the starting material, i.e. the carbon-olefin blend, must be capable of being formed into thin, nonporous sheets, most preferably by extrusion. It was found experimentally that copolymers such as ethylene-propylene copolymers containing less than 18 mole % of ethylene and having, for example, a MFR of 3.5 when mixed from about 90 to 110 parts by weight of carbon per hundred parts by weight of copolymer could not be extruded into thin nonporous sheet elements.

(b) The Mixing Technique

As stated earlier, the use of a Banbury mixer for incorporation of carbon black into propylene as described in the art involves mixing times of the order of half an hour or so and this inevitably causes degradation of the polymer and consequent deterioration of its physical and mechanical properties. This degradation is substantially reduced if the filler is incorporated into the polymer under severe conditions, involving a high degree of shear, high temperature and relatively short mixing time.

In accordance with this invention, the electrically conductive nonporous polyolefin composition is prepared by a process comprising mixing under conditions of high shear and at a temperature of at least 100° C. the propylene-ethylene copolymer and the finely divided conductive carbon, the weight ratio being at least 30 parts of carbon per copolymer, the mixing being continued until a homogeneous blend is obtained.

Mixing equipment such as a Banbury mixer or roll mill, as used in the rubber industry, may be used, the Banbury being preferred. Essentially, a Banbury-type mixer has two interdigitating screw-like vanes contained in a close-fitting housing which also mounts a ram used to exert pressure on the mix during mixing, if so desired. Heat transfer fluid can be circulated through passages in the vanes to provide heating or cooling as desired during the mixing operation. During mixing, the charge will, of course, be progressively heated by the energy expended in the shearing action. In a typical plastic compounding operation, the amount of charge required to fill the mixer to capacity is added portion-wise, generally with heating of the charge and over an extended period of time. Indeed, normally the plastic is added to the mixer and the carbon black is added in increments after the plastic has been heated in the mixer. In the preferred embodiment of the present invention, the mixer, which has been preheated to a temperature above 100° C., preferably above 150° C. and desirably up to 200° C., is charged simultaneously with the copolymer and carbon black in the requisite proportions and most preferably in an amount sufficient to completely fill the mixer after being fluxed, i.e., after it is at its final density in a fused state. When both carbon black and copolymer are charged simultaneously into the mixer, especially if the amount of charge is such that the mixer capacity will be filled after completion of the mixing operation, high shear is introduced by both the ram and vanes of the mixer. The mixing, when conducted under conditions of high shear and at temperatures between 100° C. and 200° C. in accordance with the present invention, is complete generally in less than 10 minutes and typically in from 3 to 5 minutes.

It is found that the copolymer blends prepared according to the present invention have suffered very little degradation and are readily formed into thin sheet or foil-like structures which are non-porous and also have very low resistivity of a few tens of ohms-cm at most, and which may range from about 0.5 to 10 ohms-cm according to the circumstances and the amount of carbon black incorporated. Most significantly, the copolymer blends prepared in accordance with the present invention can be extruded into thin nonporous sheets having substantially uniform volume resistivities at any point across the face of the sheet of below about 10 ohms-cm. Indeed, elements with average volume resistivities of below about 1 ohm-cm can be prepared.

(c) The Thin Non-Porous Sheets

The compounded copolymer can be formed, e.g. by calendering or extrusion, into thin non-porous foils or sheets having a thickness of between about 150 microns to about 500 microns and preferably about 250 microns and having a substantially uniform resisitivity through the volume of the sheet material at any point over its surface of below about 10 ohms-cm and preferably with average resistivities of below about 1 ohm-cm, as measured by ASTM Test Method D-257-61. Indeed, it is preferred to form the thin non-porous sheets by extrusion through a die having the requisite dimensions.

The foils or sheets can be corrugated or given a similar profile by appropriate molding techniques. For use as a bi-polar plate in an electrochemical cell, it is preferable to mount the sheet in an insulating plastic frame in a manner such as that disclosed in U.S. Pat. No. 3,530,003, for example, which patent is incorporated herein by reference.

(d) Examples

The following comparative data will illustrate the unexpected benefits of the invention.

EXAMPLE 1

Compounded compositions of Vulcan XC-72 carbon black in various proportions were made with a polypropylene homopolymer and a propylene-ethylene copolymer containing 27 mole % ethylene (PP-PE copolymer). Both resins in powder form had a MFR of 6 and a crystallinity of about 93% (before extraction) and had been previously extracted with isopropanol to remove catalyst residues, etc.

The blends were prepared in a Banbury mixer of 2.5 liter capacity which was pre-heated for half an hour at the full steam pressure of 11 kg/cm$^2$ whereby its temperature was raised to about 180° C. Polymer and carbon black were simultaneously charged to the mixer in the proportions indicated in the table and in a total amount per charge of about 3 kg. The rotor speed was 78.5 RPM and the Piston Ram pressure 4.8 kg/cm$^2$. Mixing times were from about 7 minutes for the low carbon blends to 10 minutes for the high carbon blends.

After extrusion through a flat die 12 cm wide to a sheet 0.25 mm thick, the resistivities of the resultant blends were determined by the method of ASTM-D-257-61, and the binder efficiency by plate-out test and cracks examination were determined. The results are shown in the following table:

| Binder Efficiency and Electrical Resistivity Measurements | | | | | |
|---|---|---|---|---|---|
| Vulcan XC-72/PP homopolymer | | | Vulcan XC-72/PP-PE copolymer | | |
| Ratio | Binder Efficiency | Electrical Resistivity | Ratio | Binder Efficiency | Electrical Resistivity |
| 50/100 | E | 190 ohm-cm | 50/100 | E | 11 ohm-cm |
| 60/100 | E | 147 ohm-cm | 60/100 | E | 3.5 ohm-cm |
| 70/100 | G | 137 ohm-cm | 70/100 | E | 2.5 ohm-cm |
| 75/100 | G | 132 ohm-cm | 80/100 | E | 1.4 ohm-cm |
| 77/100 | B | — | 90/100 | E | 0.97 ohm-cm |
| 80/100 | B | — | 100/100 | E | 0.48 ohm-cm |
| 90/100 | — | — | 110/100 | G | 0.27 ohm-cm |
| | | | 115/100 | B | — |

Rating:
E = Excellent
G = Good
B = Bad

As shown in the table, the binder efficiency of the copolymer is far better than that of the homopolymer with a maximum content of 110 parts of black per 100 of copolymer compared with a maximum of only 75 parts for the polypropylene. It can also be seen that using polypropylene the lowest resistivity obtainable is around 130 ohms-cm which is many times too high for the intended fuel cell and battery uses. In sharp contrast it can be seen that over the same range of proportions all of the copolymer blends are effectively within the target range of 1 to 10 ohms-cm indicating not only a higher capacity for the carbon black but also a much more effective internal distribution.

The product with 110 parts of black to 100 of copolymer was ground to give granules of about 2 mm particle size. This was fed to a 30 mm extruder with 25:1 L/D ratio equipped with a 12 cm flat die having a 250 micron lip opening. Twelve samples of the extruded non-porous sheet were taken at 15 minute intervals and twelve test specimens 10 square cm and 250 ± 1 micron thick were tested for electrical resistivity isotrophy by measuring the resistivity at nine points along the diagonals using a four electrode direct current indicator. All of the readings were within ± 10% of the average of 0.27 ohm-cm.

EXAMPLE 2

Following the procedure of Example 1, Vulcan XC-72 carbon black was compounded with a propylene-ethylene copolymer containing about 14 mole % of ethylene. The copolymer had a MFR of 3.5. After compounding the product was ground to give granules of about 2 mm particle size and then the ground product was fed to an extruder equipped with a 120 mm flat die having a 300 micron lip opening. In the case of this compounded copolymer, a non-porous sheet could not be obtained. Indeed, the compounded copolymer of this example when attempted to be extruded resulted in internal pressures at the die of about 30% greater than when using the compounded PP-PE copolymer of this invention having 20 mole % ethylene.

What is claimed is:

1. An electrically conductive nonporous polyolefin element comprising a homogeneous mixture of a crystalline propylene-ethylene copolymer containing from 20 mole % to 35 mole % ethylene and at least 30 parts by weight of finely divided conductive carbon per 100 parts by weight of copolymer, said element being in the form of a thin sheet having a thickness of from about 150 microns to about 500 microns and said element having an electric resistivity below about 10 ohm-cm as determined by ASTM Test Method D-257-61.

2. An element according to claim 1 wherein the copolymer has a Melt Flow Rate (MFR) of from 5 to 10.

3. An element according to claim 1 wherein the finely divided conductive carbon is present in an amount of 90 to 100 parts by weight per 100 parts by weight of copolymer.

4. An element according to claim 3 wherein the finely divided conductive carbon is carbon black.

5. An element according to claim 4 wherein the carbon black is acetylene black.

6. An element according to claim 1 wherein the finely divided conductive carbon has an active surface area of 300 to 500 m$^2$/gm.

7. An electrically conductive non-porous sheet having a thickness of between about 150 microns to about 500 microns comprising a homogeneous mixture of a crystalline propylene-ethylene copolymer containing from 20 mole % to 35 mole % ethylene and from 30 to 120 parts by weight of finely divided conductive carbon per 100 parts by weight of copolymer, said copolymer having a Melt Flow Rate of from 5 to 10 and said element having a resistivity below about 10 ohm-cm as determined by ASTM Test Method D-257-61.

8. In a bipolar plate for electrochemical cells having an insulating frame supporting a thin electrically conductive sheet element, the improvement wherein said sheet element comprises a crystalline propylene-ethylene copolymer having from 20 mole % to 35 mole % ethylene and a Melt Flow Rate of from 5 to 10, said copolymer compounded with from 30 parts by weight to 100 parts by weight of finely divided conductive carbon, said sheet element having a thickness of from 150 microns to 500 microns, being nonporous and having a substantially uniform volume resistivity as determined by ASTM Test Method D-257-61 of below 10 ohm-cm when measured at any point on the surface of the element.

9. The improvement of claim 8 wherein said element has an average resistivity of below about 1 ohm-cm.

* * * * *